(12) United States Patent
Kadav et al.

(10) Patent No.: US 11,086,814 B2
(45) Date of Patent: Aug. 10, 2021

(54) SYSTEM AND METHOD FOR COMMUNICATION EFFICIENT SPARSE-REDUCE

(71) Applicant: NEC Laboratories America, Inc., Princeton, NJ (US)

(72) Inventors: Asim Kadav, Jersey City, NJ (US); Erik Kruus, Hillsborough, NJ (US)

(73) Assignee: NEC CORPORATION

( * ) Notice: Subject to any disclaimer, the term of this patent is extended or adjusted under 35 U.S.C. 154(b) by 1151 days.

(21) Appl. No.: 15/489,039

(22) Filed: Apr. 17, 2017

(65) Prior Publication Data

US 2017/0300830 A1 Oct. 19, 2017

Related U.S. Application Data

(60) Provisional application No. 62/322,857, filed on Apr. 15, 2016.

(51) Int. Cl.
*G06F 15/173* (2006.01)

(52) U.S. Cl.
CPC .............................. *G06F 15/17312* (2013.01)

(58) Field of Classification Search
CPC ...... G06N 20/00; G06N 3/0454; G06N 3/126; G06N 5/046; G06N 7/005; G06N 3/006; G06N 3/02; G06N 3/0445; G06N 3/0472; G06N 3/084; G06N 3/088; G06N 20/10; G06N 5/003; G06N 20/20; G06N 3/0427; G06N 3/0436; G06N 3/086; G06N 3/049; G06N 5/04; G06N 5/025; G06N 3/08; G06N 5/02; G06N 5/022; G06N 7/02
See application file for complete search history.

(56) References Cited

PUBLICATIONS

Batson et al., "Spectral Sparsification of Graphs: Theory and Algorithms", Aug. 2013, Communications of the ACM, vol. 56, No. 8, pp. 87-94 (Year: 2013).*
Huang et al., "Bulk University of Sparse Random Matrices", Jun. 2015 (Year: 2015).*
Dean et al., "MapReduce: Simplified Data Processing on Large Clusters", Jan. 2008, Communications of the ACM, vol. 51, No. 1, pp. 107-113 (Year: 2008).*

(Continued)

*Primary Examiner* — Ann J Lo
*Assistant Examiner* — Charles C Kuo
(74) *Attorney, Agent, or Firm* — Joseph Kolodka (57) ABSTRACT

Systems and methods for building a distributed learning framework, including generating a sparse communication network graph with a high overall spectral gap. The generating includes computing model parameters in distributed shared memory of a cluster of a plurality of worker nodes; determining a spectral gap of an adjacency matrix for the cluster using a stochastic reduce convergence analysis, wherein a spectral reduce is performed using a sparse reduce graph with a highest possible spectral gap value for a given network bandwidth capability; and optimizing the communication graph by iteratively performing the computing and determining until a threshold condition is reached. Each of the plurality of worker nodes is controlled using tunable approximation based on available bandwidth in a network in accordance with the generated sparse communication network graph.

20 Claims, 6 Drawing Sheets

(56) References Cited

PUBLICATIONS

Li et al., "Scaling Distributed Machine Learning with the Parameter Server", Oct. 2014, USENIX Association, 11th USENIX Symposium on Operating Systems Design and Implementation, pp. 583-598 (Year: 2014).*

Brouwer et al., "Spectra of Graphs", Monograph, Springer, Feb. 2011, 255 pages.

Chung et al., "Laplacians and the Cheeger Inequality for Directed Graphs", Annals of Combinatorics, Apr. 2005, 21 pages, vol. 9, Issue 1.

Chung et al., "The Diameter and Laplacian Eigenvalues of Directed Graphs", The Electronic Journal of Combinations, Feb. 2006, pp. 1-7.

Dean et al., "Large Scale Distributed Deep Networks", NIPS 2012: Neural Information Processing Systems, Dec. 2012, pp. 1-9.

Dean et al., "MapReduce: Simplified Data Processing on Large Clusters", Communications of the ACM, Jan. 2001, pp. 107-113, vol. 51, No. I.

Li, et al., "Scaling Distributed Machine Learning with the Parameter Server", 11th USENIX Symposium on Operating Systems Design and Implementation, Oct. 2014, 17 pages.

McNew, et al., "The Eigenvalue Gap and Mixing Time", Semantics Scholar Org., Mar. 2011, 1-6.

* cited by examiner

```
┌─────────────────────────────────────────────────────────────┐
│ Generating a communication graph including all nodes/       │
│ machines in a cluster for one or more data parallel         │
│ frameworks                                                  │
│ 502                                                         │
└─────────────────────────────────────────────────────────────┘
                              │
                              ▼
┌─────────────────────────────────────────────────────────────┐
│ Computing model parameters in distributed shared memory of  │
│ worker nodes and sending model parameters with notification │
│ to other worker nodes                                       │
│ 504                                                         │
└─────────────────────────────────────────────────────────────┘
                              │
                              ▼
┌─────────────────────────────────────────────────────────────┐
│ Performing distributed Machine Learning training            │
│ 506                                                         │
└─────────────────────────────────────────────────────────────┘
                              │
                              ▼
┌─────────────────────────────────────────────────────────────┐
│ Performing stochastic reduce for approximate processing     │
│ 508                                                         │
└─────────────────────────────────────────────────────────────┘
                              │
                              ▼
┌─────────────────────────────────────────────────────────────┐
│ Determining spectral gap using stochastic reduce            │
│ convergence analysis                                        │
│ 510                                                         │
└─────────────────────────────────────────────────────────────┘
                              │
                              ▼
┌─────────────────────────────────────────────────────────────┐
│ Performing fine grained synchronization                     │
│ 512                                                         │
└─────────────────────────────────────────────────────────────┘
                              │
                              ▼
┌─────────────────────────────────────────────────────────────┐
│ Optimizing one or more data parallel frameworks based on    │
│ the results of the stochastic reduce and/or the fine        │
│ grained synchronization                                     │
│ 514                                                         │
└─────────────────────────────────────────────────────────────┘
```

SYSTEM AND METHOD FOR COMMUNICATION EFFICIENT SPARSE-REDUCE

This application claims priority to provisional application No. 62/322,857, filed on Apr. 15, 2016, incorporated herein by reference in its entirety.

BACKGROUND

Technical Field

The present invention relates to management of a sparse communication network, and more particularly to determining an optimal sparse communication network for performing partial reduce over a network of nodes performing distributed optimization.

Description of the Related Art

Emerging workloads (e.g., graph processing, machine learning, etc.) are approximate because of the scale of data involved and the stochastic nature of the underlying algorithms. These algorithms are often distributed over multiple machines using, for example, bulk-synchronous processing (BSP) or other synchronous processing paradigms (e.g., map-reduce). However, data parallel processing primitives (e.g. repeated barrier and reduce operations) introduce high synchronization overheads, and thus a high usage of processing power. Hence, many conventional data-processing platforms use asynchrony and staleness to improve data-parallel job performance. Some conventional methods include simply changing synchronous communication to asynchronous between the worker nodes/machines in the cluster. This can improve the throughput of data processing, but also results in poor accuracy of the final output (e.g., because different workers may progress at different speeds and process inconsistent intermediate outputs).

Conventional systems and methods use a fixed graph to perform reduce operations over a network of codes. Communication graph architectures include, for example, the parameter server, all-reduce, butterfly reduce, etc. Conventionally, a dedicated parameter server is employed to collect all model updates and to send out the model-updates to all nodes. In these systems, all parallel models send model updates to a single server and receive an updated model, with the server sending model updates to and from all nodes, causing network slowdowns and increasing processing power usage. In other parallel learning systems, one efficient mechanism to improve all-reduce is by arranging nodes in a tree fashion. The leaf nodes communicate gradients towards the parent, and the head of the tree computes the total (e.g., average) and sends it back towards the leaf. This requires multiple hops to send and receive the gradient that increases latency, and arranging the node in a tree structure, which complicates fault tolerance in case of a failure.

SUMMARY

According to an aspect of the present principles, a method is provided for building a distributed learning framework, including generating a sparse communication network graph with a high overall spectral gap. The generating includes computing model parameters in distributed shared memory of a cluster of a plurality of worker nodes; determining a spectral gap of an adjacency matrix for the cluster using a stochastic reduce convergence analysis, wherein a spectral reduce is performed using a sparse reduce graph with a highest possible spectral gap value for a given network bandwidth capability; and optimizing the communication graph by iteratively performing the computing and determining until a threshold condition is reached. Each of the plurality of worker nodes is controlled using tunable approximation based on available bandwidth in a network in accordance with the generated sparse communication network graph.

According to another aspect of the present principles, a system is provided for building, using a processor coupled to a memory, a distributed learning framework, including generating a sparse communication network graph with a high overall spectral gap. The generating includes computing model parameters in distributed shared memory of a cluster of a plurality of worker nodes; determining a spectral gap of an adjacency matrix for the cluster using a stochastic reduce convergence analysis, wherein a spectral reduce is performed using a sparse reduce graph with a highest possible spectral gap value for a given network bandwidth capability; and optimizing the communication graph by iteratively performing the computing and determining until a threshold condition is reached. Each of the plurality of worker nodes is controlled using tunable approximation based on available bandwidth in a network in accordance with the generated sparse communication network graph.

According to another aspect of the present principles, a non-transitory computer readable medium is provided for building a distributed learning framework, including generating a sparse communication network graph with a high overall spectral gap. The generating includes computing model parameters in distributed shared memory of a cluster of a plurality of worker nodes; determining a spectral gap of an adjacency matrix for the cluster using a stochastic reduce convergence analysis, wherein a spectral reduce is performed using a sparse reduce graph with a highest possible spectral gap value for a given network bandwidth capability; and optimizing the communication graph by iteratively performing the computing and determining until a threshold condition is reached. Each of the plurality of worker nodes is controlled using tunable approximation based on available bandwidth in a network in accordance with the generated sparse communication network graph.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present principles, systems and methods are provided for providing tunable approximate processing for large scale data applications using stochastic reduction.

In a particularly useful embodiment, a system and method for providing asynchronous and approximate processing semantics with consistency and convergence guarantees by synchronizing each worker node/machine with a subset of worker nodes/machines at each of one or more iterations. The present principles may also be employed to provide fine-grained synchronization which improves convergence behavior and reduces synchronization overheads over a barrier in accordance with various embodiments.

In some embodiments, a model for asynchronous and approximate processing semantics for data-parallel computation is provided in accordance with the present principles. The present invention may provide fine-grained worker synchronization using, for example, NOTIFY-ACK semantics that allows independent worker nodes/machines to run asynchronously. The present principles may also be employed to provide stochastic reduce, which provides approximate but guaranteed convergence to the same result as an aggregated all-reduce. The present invention has been shown in experimental results to reduce synchronization costs, providing, for example, 2-10 times speedups in convergence and up to 10 times savings in network costs for distributed machine learning applications, and further provides strong convergence guarantees.

Large-scale distributed data-parallel computation often provides two fundamental constructs to scale-out local data processing. First, a merge or a reduce operation to allow the workers to merge updates from all other workers and second, a barrier or an implicit wait operation to ensure that all workers can synchronize and operate at similar speeds. For example, the bulk-synchronous model (BSP) is a general paradigm to model data-intensive distributed processing. Here, each node after processing a specific amount of data synchronizes with the other nodes using barrier and reduce operations. The BSP model may be used to implement many big data applications, frameworks and libraries such as in the areas of graph processing and machine learning. Other synchronous paradigms such as the map-reduce, the parameter server, and dataflow based systems use similar constructs to synchronize outputs across multiple worker nodes/machines.

There is an emerging class of big data applications such as graph-processing and machine learning (ML) that are approximate because of the stochastic nature of the underlying algorithms that converge to a final solution in an iterative fashion. These iterative-convergent algorithms operate on large amounts of data and unlike traditional TPC style workloads that are CPU bound, these iterative algorithms incur significant network and synchronization costs by communicating large vectors between their workers. These applications can gain an increase in performance by reducing the synchronization costs in two ways.

First, the workers can operate over stale intermediate outputs. The stochastic algorithms operate over input data in an iterative fashion to produce and communicate intermediate outputs with other workers. However, it is not imperative that the workers perform a reduce on all the intermediate outputs at every iteration. Second, the synchronization requirements between the workers may be relaxed, allowing partial, stale or overwritten outputs. This is possible because in some cases the iterative nature of data processing and the stochastic nature of the algorithms may provide an opportunity to correct any errors introduced from staleness or incorrect synchronization.

There has been recent research that exploits this property by processing stale outputs, or by removing all synchronization. However, naively converting the algorithms from synchronous to asynchronous can increase the throughput, but does not improve the convergence speeds. This is at least in part because an increase in data processing speeds may not produce the final output with same accuracy, and in some cases may even converge the underlying algorithm to an incorrect value.

Hence, to provide asynchronous and approximate semantics with reasonable correctness guarantees for iterative convergent algorithms, asynchronous and approximate abstractions for data-parallel computation may be employed in accordance with various embodiments of the present principles. To facilitate approximate processing, the present invention may include stochastic reduce, a sparse reduce primitive which mitigates the communication and synchronization costs by performing the reduce operation with fewer workers. In some embodiments, a reduce operator may be constructed by choosing workers based on sparse expander graphs on underlying communication nodes that mitigates CPU and network costs during reduce for iterative convergent algorithms. Furthermore, stochastic reduce convergence may be directly proportional to the spectral gap of the underlying machine graph that enables practitioners to introduce reduce approximations based on available network bandwidth in accordance with the present principles.

In various embodiments, by adopting a sparse communications graph, the present principles depart from having global consistency of conventional distributed shared memory (DSM) during machine learning (ML). The DSM employed according to the present principles is a relaxed consistency DSM.

In some embodiments, to reduce synchronization costs, a fine-grained NOTIFY-ACK based synchronization that provides performance improvement over barrier based methods may be executed in accordance with the present principles. NOTIFY-ACK enables independent worker (e.g., worker node/machine) threads (such as those in stochastic reduce) to run asynchronously instead of blocking on a coarse-grained global barrier at every iteration. Additionally, NOTIFY-ACK provides stronger consistency than simply using a barrier to implement synchronous data-parallel processing.

The system and methods in accordance with the present principles may be employed using, for example, a first-generation distributed machine learning (ML) framework. In some embodiments, semantics for provable approximate and asynchronous execution may be advantageously generated and employed, and such semantics are not present in conventional distributed ML systems, which often use asynchrony and staleness to improve the input processing throughput.

In accordance with various embodiments, an asynchronous approximate computation model for large scale data parallel applications is provided in accordance with the present principles. Stochastic reduce may be employed for approximate semantics and fine-grained synchronization based on NOTIFY-ACK to allow independent threads run asynchronously. The present principles also may be applied to build a distributed learning framework. Experimental results have shown that the present system and method achieves at least 2-10 times benefit in convergence, and 10 times savings in network costs as compared with conventional systems and methods.

Large-scale problems such as training image classification models, page-rank computation and matrix factorization operate on large amounts of data. As a result, many stochastic algorithms have been proposed that make these problems tractable for large data by iteratively approximating the solution over small batches of data. For example, to scale better, matrix factorization methods have moved from direct and exact factorization methods such as singular value decomposition to iterative and approximate factorization using gradient descent style algorithms. Hence, many algorithms that discover relationships within data have been rewritten in the form of distributed optimization problems that iterate over the input data and approximate the solution. The present principles may be applied to provide asynchronous and approximate semantics to distributed machine learning applications in accordance with various embodiments.

Machine learning algorithms process data to build a training model that can generalize over new data. The training output model, or the parameter vector (represented by w) is computed to perform future predictions over new data. To train over large data, ML methods may use a Stochastic Gradient Descent (SGD) algorithm that can train over a single (or a batch) of examples over time. The SGD algorithm processes data examples to compute the gradient of a loss function. The parameter vector is then updated based on this gradient value after processing each training data example. After a number of iterations, the parameter vector or the model converges towards acceptable error values over test data.

In some embodiments, to scale out the computation over multiple machines, the SGD algorithm can be distributed over a cluster by using data parallelism, by splitting the input $(x1, x2, \ldots, xn)$ or by model parallelism, by splitting the model $(w1, w2, \ldots, wn)$. A goal of parallelization is not just to improve throughput but also to maintain low error rates $(e1, e2, \ldots, en)$. In data-parallel learning using BSP, the parallel model replicas train over different machines. After a fixed number of iterations, these machines synchronize the parameter models that have been trained over the partitioned data with one-another using a reduce operation. For example, each machine may perform an average of all incoming models with its own model, and proceed to train over more data. In the BSP model, there is a global barrier that ensures that models train and synchronize intermediate inputs at the same speeds.

Hence, distributed data-parallel ML suffers from additional synchronization and communication costs over a single thread. The reduce operation requires communicating models to all other machines when training using the BSP or map-reduce model. However, since these algorithms are iterative-convergent, and can tolerate errors in the synchronization step, there has been recent work on communicating stale intermediate parameter updates and exchanging parameters with little or no synchronization.

Past research has found that simply removing the barrier may speed up the throughput of the system. However, this does not always improve the convergence speed, and may even converge the system to an incorrect final value. Since the workers do not synchronize, and communicate model parameters at different speeds, the workers process the data examples at a higher throughput. However, since different workers train at different speeds, the global model skews towards the workers that are able to process and communicate their models. Similarly, using bounds for asynchrony may appear to work for some workloads, but determining these bounds can be empirically difficult, and for some datasets these bounds may be no better than synchronous. Furthermore, if a global single model is maintained and updated without locks, a global convergence may only be possible if the parameter vector is sparse. Furthermore, maintaining a global single model in a distributed setting results in a large amount of wasted communication as many of the useful parameter updates may be overwritten.

A distributed parameter-server architecture may limit network traffic by maintaining a central master node/machine. In some embodiments, the server may coordinate the parameter consistency among all other worker nodes/machines by, for example, resetting the model for the worker nodes after every iteration and ensure global consensus on the final model. Hence, a single server may communicate with a large number of workers, and may result in network congestion at the edges which can be mitigated using a distributed parameter server. However, the parameter server may suffer from similar synchronization issues as BSP style systems (e.g., a synchronous server may spend a significant amount of time at the barrier while an asynchronous server may reduce with few models of workers and produce inconsistent intermediate outputs), and this can slow down convergence.

Thus, the parameter server architecture may benefit from a fine-grained synchronization mechanism that have low overheads in accordance with the present principles. In some embodiments, the present principles may be employed to provide asynchronous and approximate processing semantics with consistency and convergence guarantees. The present invention may provide approximate processing by synchronizing each worker (e.g., worker node) with a subset of workers at each iteration. The machine learning training framework in accordance with the present principles relaxes the typical global consistency (e.g., using approximate consistency) of a model stored in a conventional DSM. Similar relaxed consistency of the shared model is also useful in parameter server scenarios, where asynchrony or bounded staleness results in local models departing from the global model during the training procedure. In some embodiments, at the end of training it is desirable for the model to return to global consistency. Furthermore, the present invention may provide fine-grained synchronization that improves convergence behavior and reduces synchronization overheads over a barrier in accordance with various embodiments, which will be described in further detail herein below.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
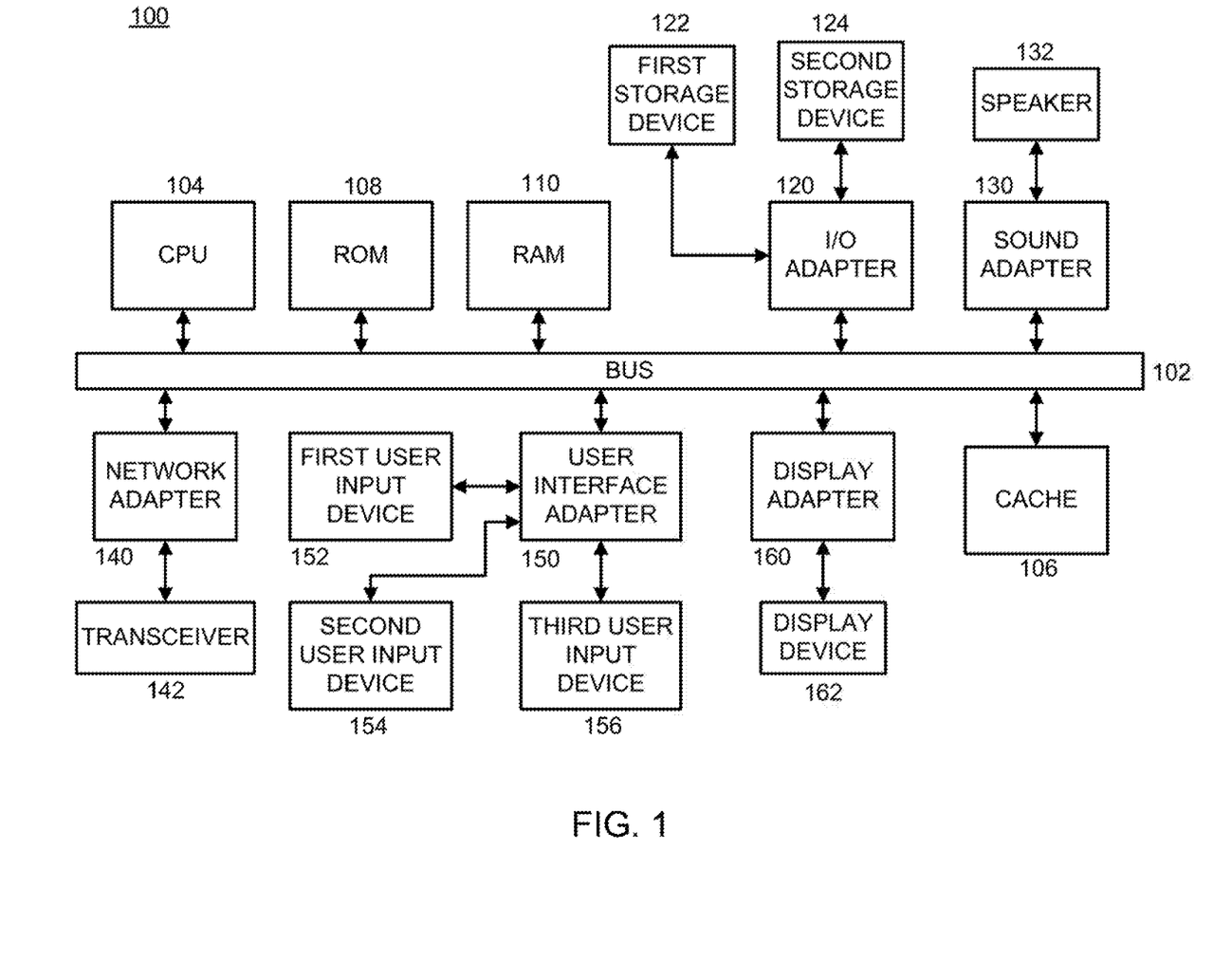
FIG. 1 is a block/flow diagram illustrating an exemplary processing system to which the present principles may be applied, in accordance with the present principles.

Referring now in detail to the figures in which like numerals represent the same or similar elements and initially to FIG. 1, an exemplary processing system 100, to which the present principles may be applied, is illustratively depicted in accordance with one embodiment of the present principles.

The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 100, 200, 201, 202, 203, 300, 400, and 600, described with respect to FIGS. 1, 2A, 2B, 2C, 2D, 3, 4, and 6, respectively, are systems for implementing respective embodiments of the present principles. Part or all of processing system 100 may be implemented in one or more of the elements of systems 100, 200, 201, 202, 203, 300, 400, and 600, according to various embodiments of the present principles.

Further, it is to be appreciated that processing system 100 may perform at least part of the method described herein including, for example, at least part of methods 200, 201, 202, 203, 300, 400, and 500 of FIGS. 2A, 2B, 2C, 2D, 3, 4, and 5, respectively. Similarly, part or all of system 600 may be used to perform at least part of methods 200, 201, 202, 203, 300, 400, and 500 of FIGS. 2A, 2B, 2C, 2D, 3, 4, and 5, respectively, according to various embodiments of the present principles.

Referring now to FIGS. 2A, 2B, 2C, and 2D, high-level diagrams showing a system and method for an all-reduce distributed machine learning (ML) training architecture 200; a parameter server ML training architecture 201; an expander graph distributed ML training architecture 202; and a chain graph ML training architecture 203, respectively, are illustratively depicted in accordance with embodiments of the present principles.

Figure 2A:
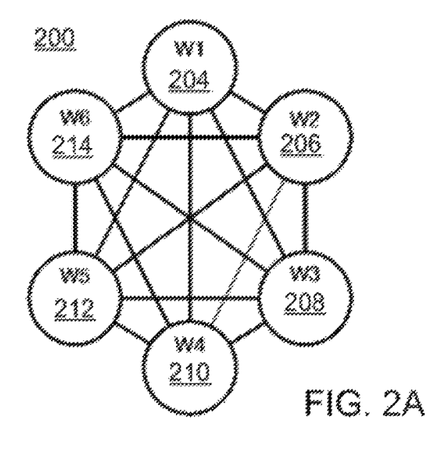
FIG. 2A is a block/flow diagram illustrating a high-level system/method for an all-reduce distributed machine learning training architecture, in accordance with the present principles.
Figure 2B:
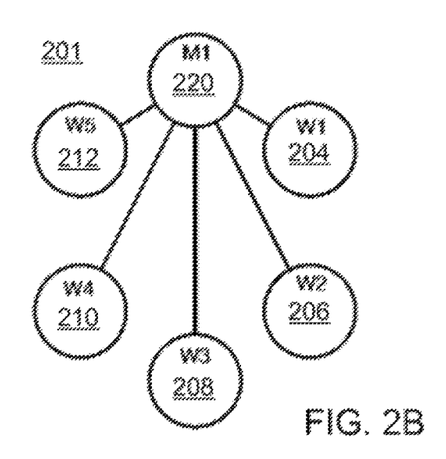
FIG. 2B is a block/flow diagram illustrating a high-level system/method for a parameter server machine learning training architecture, in accordance with the present principles.

In some embodiments using distributed ML, parallel worker nodes 204, 206, 208, 210, 212, 214 (e.g., worker nodes/machines) train on input data over model replicas. They synchronize after a plurality of iterations and may perform a reduce over intermediate model updates and continue to train. This synchronization step is referred to as an all-reduce step 200. In one embodiment, in the parameter server model 201, this synchronization for a plurality of nodes 204, 206, 208, 210, 212 may be performed at a single or distributed master 220. To mitigate any reduce overheads, efficient all-reduce has been explored in the map-reduce context where nodes perform partial aggregation in a tree-style to reduce network costs. However, these methods decrease the network and processing costs at the cost of increasing the latency of the reduce operation proportional to the height of the tree.

Figure 2C:
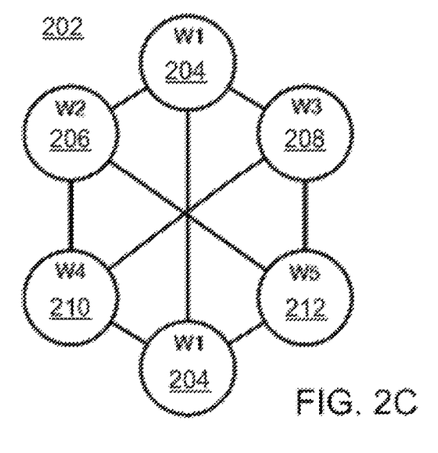
FIG. 2C is a block/flow diagram illustrating a high-level system/method for an expander graph distributed machine learning training architecture, in accordance with the present principles.

In accordance with an embodiment of the present principles, a network of worker nodes 204, 206, 208, 210, 212, 214 (e.g., the node communication graph of the clusters) determines how rapidly intermediate model parameters are propagated to all other machines, and also determines the associated network and processing costs. For example, all-reduce 200 and the parameter server 201 represent different types of communication graphs that describe how the workers communicate the intermediate results. Intuitively, if the workers communicate with all machines at every reduce step, this network is densely connected and convergence is rapid since all the machines get the latest intermediate updates. However, if the network of nodes is sparsely connected, the convergence may be slow due to stale, indirect updates being exchanged between machines. In some embodiments with sparse connectivity, the present principles may be employed to generate savings in network and CPU costs (e.g., fewer updates to process at each node), which results in an overall speedup in job completion times.

In some embodiments, if there is a heterogeneity in communication bandwidths between the workers 204, 206, 208, 210, 212, 214 (or between the workers 204, 206, 208, 210, 212, 214 and the master 220, if a master is used), many workers may end up waiting. As an example, if one worker 204 is training using GPUs over a cluster, GPUs within one machine can synchronize at far lower costs over the PCI bus than over the network. Hence, frequent reduce across interconnects with varying latency may introduce a large synchronization cost for all workers 204, 206, 208, 210, 212, 214.

Hence, in various embodiments, sparse and/or stochastic reduce based on sparse node graphs with strong connectivity properties may be employed in accordance with the present principles. Such employing sparse and/or stochastic reduce in accordance with the present principles improves node and overall network performance by, for example, reducing network and processing costs by using sparse reduce graphs.

In accordance with the present principles, every dense graph can be reduced to an equivalent approximate sparse graph with fewer edges. This is a significant result since it shows that stochastic reduce according to various embodiments can be applied to save network costs for essentially any network topology. Expander graphs 202, which are sparse graphs with strong connectivity properties have been explored in the context of data centers and distributed communities to communicate data with low overheads. An expander graph 202 has fixed out-degrees as the number of vertices increase while maintaining approximately the same connectivity between the vertices. Hence, using an expander graph 202 for stochastic reduce in accordance with the present principles provides approximately the same convergence as all-reduce 200 while keeping network costs low as the number of nodes increase.

In one embodiment, to measure the convergence of algorithms that use stochastic reduce (e.g., to compare the sparsity of the adjacency graph of communication), the spectral gap of the adjacency matrix of the network of workers 204, 206, 208, 210, 212, 214 may be determined in accordance with the present principles. The spectral gap is the difference between the two largest singular values of the adjacency matrix normalized by the in-degree of every node. The spectral gap of a communication graph determines how rapidly a distributed, iterative sparse reduce converges when performing distributed optimization over a network of nodes 204, 206, 208, 210, 212, 214 represented by the graph. For faster convergence and increased consistency of the DSM view of model parameters while training in a distributed learning framework, this value may be as high as reasonably possible in accordance with the present principles. Hence, well-connected graphs have a high spectral gap value and converge faster, but will have high communication costs.

In accordance with the present principles, a high spectral gap value means that the spectral gap should be as high as possible (as shown in Table 1). Examples of low values would be less than 0.1, and a high spectral value would be as close to 1 as possible given network constraints. Conversely, if the graph is disconnected, the spectral gap value is zero, and with partitioned data, the model may never converge to a correct value. In this case, eventual consistency of the model parameters in distributed shared memory may never occur. In accordance with various embodiments, the model parameters in distributed shared memory of a cluster are in a state of approximate consistency.

In some embodiments, a spectral gap may be determined as follows:

$$1-\sigma 2(P),$$

where $\sigma 2(P)$ is the second highest spectral gap of a matrix P. P may be calculated as A/d, where A is the adjacency graph (or communication graph of the network of nodes), and d is the in-degree of each node including itself. The second highest spectral gap may be referred to as the eigenvalue. In spectral graph theory, a Ramanujan graph, named after Srinivasa Ramanujan, is a regular graph whose spectral gap is almost as large as possible. Such graphs are excellent spectral expanders, and such graphs may be employed to determine a spectral gap in accordance with the present principles.

In some embodiments, for directed graphs, eigenvalues are in general complex (but occur in pairs). We use lazy random walks (our case, self-loops make sense (they are free)), so the spectral gap can be extended from undirected to directed as, for example, minimum over other eigenvalues (|largest eigenvalue|−|(other eigenvalues|). Spectral gaps may be employed, and may be related to mixing time in Markov Processes. In one embodiment, if the Markov chain is lazy, we can define its eigenvalue or spectral gap, the difference of its two largest eigenvalues, to be $\lambda\_1-\lambda\_2=1-\lambda\_2$. (In greater generality, this would be $1-\max\{|\lambda 2|,\ldots|\lambda n|\}$.) The eigenvalue gap is useful because it can be used to put a bound on the mixing time for the Markov chain. Thus, a high spectral gap enables fast mixing time, and may be implemented using a directed graph (e.g., communication graph) in accordance with the present principles. It is noted that in all the graphs of FIGS. 2A-2D, the implicit self-loop (e.g., i→(i+0)) is not shown.

Figure 2D:
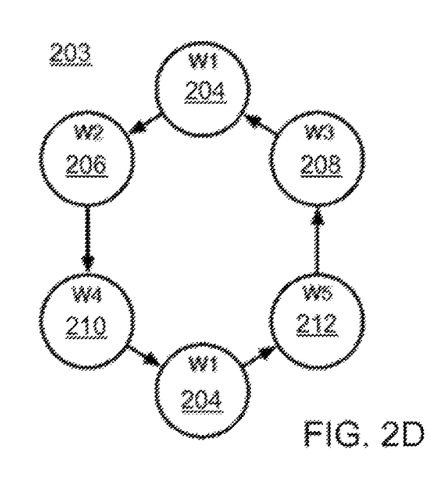
FIG. 2D is a block/flow diagram illustrating a high-level system/method for a chain graph distributed machine learning training architecture, in accordance with the present principles.

In various embodiments, the spectral gap definition of a Ramanujan graph shows what a "high" spectral gap means as a smooth function of common in-degree/out-degree k, varying between the extremes of FIGS. 2D and 2A in accordance with the present principles. In accordance with the present principles, the spectral gaps in the present invention approach those of corresponding Ramanujan graphs.

In some embodiments, the present principles may be employed to reason convergence using the spectral gap of a network graph 200, 201, 202, 203, and developers can reason why some node graphs have stronger convergence properties based on the output. Conventional approaches use a global barrier after each iteration, incurring extra synchronization overheads, which can be reduced by performing fine-grained synchronization in accordance with the present principles, which will be described in further detail herein below.

As illustratively depicted in FIGS. 2A-2D, six exemplary nodes (e.g., 204, 206, 208, 210, 212, 214, 220) are connected using four distributed ML training architectures (e.g., all-reduce 200, parameter server 201 (non-distributed), expander graph 202 with a fixed out degree of two, and a chain architecture 203). For purposes of illustration, the respective spectral gaps for each architecture for six and twenty-five nodes is shown in Table 1, below:

TABLE 1

Exemplary Spectral Gaps

| | Spectral Gap for 6 Nodes | Spectral Gap for 25 Nodes |
|---|---|---|
| All-reduce | 1.00 | 1.00 |
| Parameter server | 0.75 | 0.68 |
| Expander graph | 0.38 | 0.2 |
| Chain graph | 0.1 | 0.002 |

In accordance with the present principles, architectures with more edges have a high-spectral gap. FIG. 2A shows the all-reduce 200, where all machines communicate with one-another, and increasing the number of nodes significantly increases the network costs. FIG. 2B shows the parameter server 201 has a reasonably high spectral gap, but using a single master 220 with a high fanout requires considerable network bandwidth, and, for example, Paxos-style reliability for the master. FIG. 2C shows a root expander graph 202, which has a fixed out-degree of two, and in a network of N total nodes, each node i sends the intermediate output to its neighbor (i+1) (e.g., to ensure connectivity) and to i+$\sqrt{N}^{th}$ node. In some embodiments, the graph 202 depicted in FIG. 2C has i→i+1 and i+3. However, it is noted that i+3 is only approximately i+$\sqrt{N}$ because, for example, $\sqrt{6}$=2.44, which is closer to 2 than to 3.

In various embodiments, such root expander graphs 202 ensure that the updates are spread across the network as N scales since the root increases with N. FIG. 2D shows a chain like graph 203, where the nodes 204, 206, 208, 210, 212 are connected in a chain-like fashion and intermediate parameter updates from. In an illustrative embodiment, for example, node i may spread to i+1 in a single time step, but will use N time steps to reach to the last node in the cluster and further has low spectral gap values. Although the present principles may be applied to any type of network and network graphs, for simplicity of illustration, the root sparse expander graph 202 with a fixed out-degree of two, as shown in FIG. 2C, will be employed herein below with respect to the description of stochastic reduce in accordance with the present principles.

In various embodiments, employing sparse expander reduce graphs 202 with just two out-degrees provides good, sufficient convergence and speedup over all-reduce 200 (e.g., high enough spectral gap values with reasonably low communication costs). Using sparse expander reduce graphs 202 with stochastic reduce in accordance with the present principles results in faster model training times because, for example, the amount of network time is reduced, and the synchronization time is reduced since each machine communicates with fewer nodes. Moreover, the CPU costs at each node 204, 206, 208, 210, 212 may be reduced since they process fewer incoming model updates.

For stochastic reduce to be effective, the following properties are desirable, and are employed in accordance with various embodiments of the present principles. First, a node communication graph 202 may be generated, and selected to have a high spectral gap. This ensures that the model updates from each machine are diffused across the network rapidly. Second, the node communication graphs 202 should have low communication costs. For example, the out-degrees of each node in the graph 202 should have small out-degrees (e.g., 2). Finally, the graph should be easy to generate (e.g., using a sequence to accommodate a variable number of nodes/machines, a possible reconfiguration in case of a failure, etc.).

In an exemplary embodiment, the graph 202 shows an i ↔ {i+1, i+3} undirected expander graph. In a network of N nodes, a reasonable expander graph may be constructed, having each node i send its intermediate output to (i+1), and to (i+Δ)$^{th}$ node, where Δ≈$\sqrt{N}$.

In accordance with various embodiments, these properties can be used to guide existing data-parallel optimizers to reduce data shuffling costs by constructing sparse reduce graphs to accommodate available network costs and other constraints (e.g., avoiding cross-rack reduce). The synchronization costs may be reduced by employing fine-grained communication in accordance with the present principles, which will be described in further detail herein below.

Figure 3:
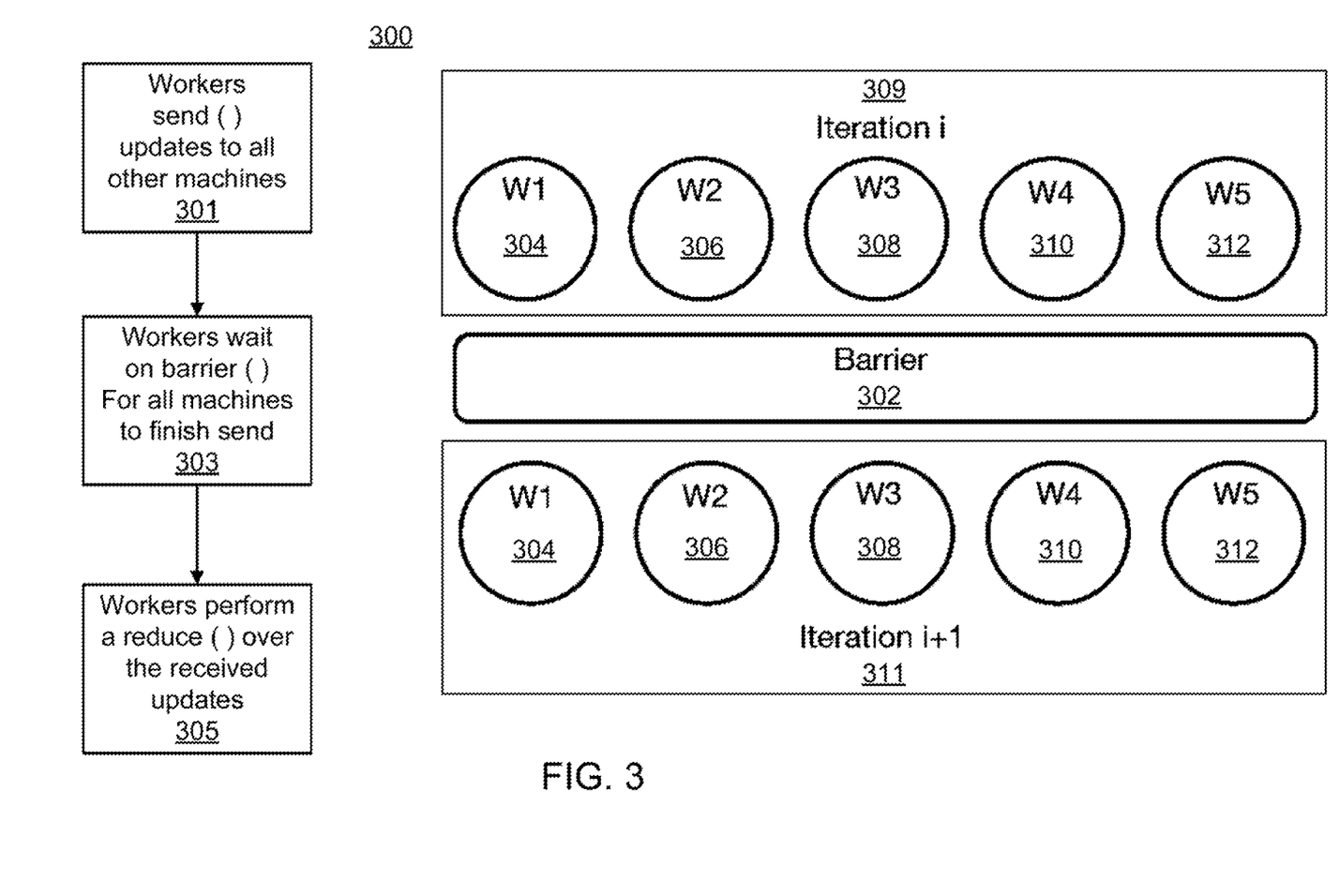
FIG. 3 is a block/flow diagram illustrating a system/method for barrier based synchronization, in accordance with the present principles.

Referring now to FIG. 3, a block/flow diagram showing a system and method 300 for barrier based synchronization is illustratively depicted in accordance with the present principles. FIG. 3 shows sparse synchronization semantics where worker nodes/machines W1, W2, and W3 (304, 306, and 308, respectively) synchronize with each other, and worker nodes/machines W3, W4, and W5 (308, 310, and 312) synchronize with each other. In some embodiments using a barrier 302, all workers 304, 306, 308, 310, 312 wait for every other worker in a first iteration 307, and then proceed to a next iteration 309 in accordance with the present principles.

Barrier based synchronization is an important operation for synchronizing parallel ML programs across multiple nodes/machines (e.g., 304, 306, 308, 310, 312). After executing a barrier operation, a parallel worker waits until all the processes in the system have reached a barrier. Parallel computing libraries like Message Passing Interface (MPI), as well as data parallel frameworks such as Bulk Synchronous Parallel (BSP) systems, and some parameter servers expose this primitive to developers. Furthermore, ML systems based on map-reduce may use a stage barrier between the map and reduce tasks to synchronize intermediate outputs across machines.

FIG. 3 shows an exemplary parallel training system on n processes. Each process trains on a subset of data and computer intermediate model updates, and a send command is issued which instructs workers 304, 306, 308, 310, 312 to send to all other workers in block 301. In block 302, workers wait on the barrier primitive for all workers to finish the send. When all processes arrive at the barrier 302, the workers 304, 306, 308, 310, 312 perform a reduce operation over the incoming output in block 305, and may continue processing more input in a next iteration 309.

However, using the barrier 302 as a synchronization point in the code suffers from several problems: First, the BSP protocol described above, suffers from mixed-version issues i.e. in the absence of additional synchronization or serialization at the receive side, a receiver may perform a reduce with partial or torn model updates (or skip them if a consistency check is enforced). This is because just using a barrier gives no information if the recipient has finished receiving and consuming the model update. Second, most barrier implementations synchronize with all other processes in the computation. In contrast, with stochastic reduce, finer grained synchronization primitives are required that will block on only the required subset of workers to avoid unnecessary synchronization costs. A global barrier operation is slow and removing this operation can reduce synchronization costs, but makes the workers process inconsistent data that may slow down the overall time to achieve the final accuracy. Finally, using a barrier can cause network resource spikes if all the processes send their parameters at the same time.

Adding extra barriers 302 before or after push and reduce, does not produce a strongly consistent BSP that can incorporate model updates from all replicas since the actual send operation may be asynchronous, and thus there is no guarantee the receivers receive these messages when they perform a reduce. Unless a blocking receive is added after every send, the consistency is not guaranteed. However, adding a blocking receive introduces a significant synchronization overhead.

In various embodiments, to provide efficient coordination among parallel model replicas in accordance with the present principles, three properties are selected and employed from any type of synchronization profile. First, the synchronization should be fine-grained. Coarse-grained synchronization such as barrier impose high overheads, as discussed above. Second, the synchronization mechanism should provide consistent intermediate outputs. Strong consistency methods avoid torn-reads and mixed version parameter vectors, and improve performance. Finally, the synchronization should be efficient. Excessive receive-side synchronization for every reduce and send operation can significantly increase blocking times.

In data-parallel systems with barrier based synchronization, there is often no additional explicit synchronization between the sender and receiver when an update arrives. Furthermore, any additional synchronization may reduce the performance especially when using low latency communication hardware such as RDMA that allow one-sided writes without interrupting the receive-side CPU. In the absence of synchronization, a fast sender can overwrite the receive buffers, or the receiver may perform a reduce with a fewer senders instead of consuming each worker's output, which hurts convergence.

Some conventional dataflow based data-parallel systems provide a notify mechanism to inform the receivers about the incoming model updates. This ensures that when a node performs a local reduce, it consumes the intermediate outputs from all machines. Hence, a per-receiver notification allows for finer-grained synchronization. However, simply using a NOTIFY is not enough since a fast sender can overwrite the receive queue of the receiver, and a barrier or any other style of additional synchronization is then necessary to ensure that the parallel workers process incoming model parameters at the same speeds.

In some embodiments, to eliminate the barrier overheads for stochastic reduce and to provide strong consistency, a NOTIFY-ACK based synchronization mechanism may be employed in accordance with the present principles. This gives stricter guarantees than using a coarse grained barrier, and can also improve convergence times since it facilitates using consistent data from dependent workers during the reduce step. The NOTIFY-ACK based synchronization will be described in further detail herein below with reference to FIG. 4.

Figure 4:
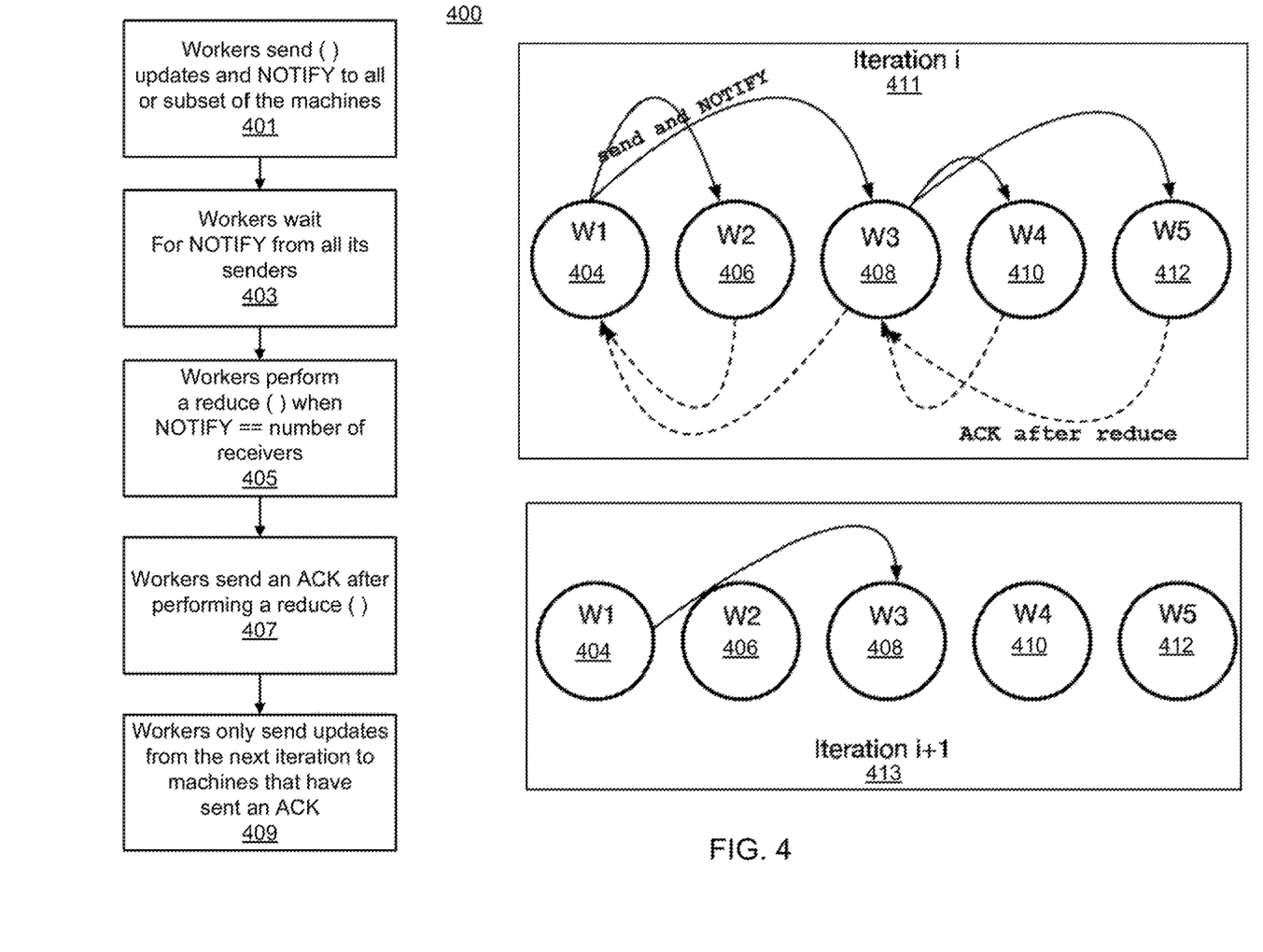
FIG. 4 is a block/flow diagram illustrating a system/method for NOTIFY/ACK based synchronization, in accordance with the present principles.

Referring now to FIG. 4, a block/flow diagram showing a system and method for NOTIFY/ACK based synchronization is illustratively depicted in accordance with the present principles. In one embodiment, fine grained synchronization is performed using worker nodes/machines W1, W2, W3, W4, and W5 (404, 406, 408, 410, and 412, respectively). The workers 404, 406, 408, 410, and 412 issue send updates and NOTIFY to all or a subset of all the workers in block 401, and the workers only wait for intermediate outputs from dependent workers to perform a reduce in block 403. In block 405, the workers 404, 406, 408, 410, and 412 perform a reduce when NOTIFY=a number of receivers. After the reduce in block 405, workers push more data out when they receive an ACK from receivers in block 407, signaling that a sent parameter update has been consumed. In block 409, after a first iteration 411, workers only send updates from a next iteration 411 to workers that have sent an ACK in accordance with the present principles.

In some embodiments using NOTIFY-ACK, the parallel workers 404, 406, 408, 410, and 412 compute and send their model parameters with notifications to other workers in block 401. Then the workers proceed to wait to receive notifications from all its senders as defined by their node communication graphs in block 403. The wait operation counts the NOTIFY events and invokes the reduce when a worker has received notifications from all its senders in block 405, as shown in the node communication graphs 409, 411. Once all notifications have been received, a consistent reduce may be performed in accordance with the present principles.

In some embodiments, after performing a reduce in block 405, the workers 404, 406, 408, 410, and 412 send ACKs, indicating that the intermediate output in previous iteration has been consumed, in block 407. Only when a sender receives this ACK for a previous send, it may proceed to send the data for the next iteration 411 in block 409. Unlike a barrier based synchronization, where there is no guarantee that a receiver has consumed the intermediate outputs from all senders, waiting on ACKs from receivers in accordance with the present principles ensures that a sender does not flood the receive side queue, and thus avoids any mixed version issues from overlapping intermediate outputs. Furthermore, fine-grained synchronization in accordance with the present principles allows efficient implementation of stochastic reduce since each sender is only blocked by dependent workers and other workers may run asynchronously.

The system and method 400 using NOTIFY-ACK in accordance with the present principles needs no additional receive-side synchronization, thus making it ideal for direct-memory access style protocols (e.g., Remote Direct Memory Access (RDMA) or (Graphics Processing Unit (GPU) Direct). In some embodiments, NOTIFY-ACK uses ordering guarantees of the underlying implementation to guarantee that a NOTIFY arrives after the actual data. Furthermore, in a NOTIFY-ACK based implementation 400, the framework ensures that the workers send their intermediate updates, and then wait on their reduce inputs to avoid any deadlock from a cyclic node communication graphs in accordance with the present principles.

Figure 5:
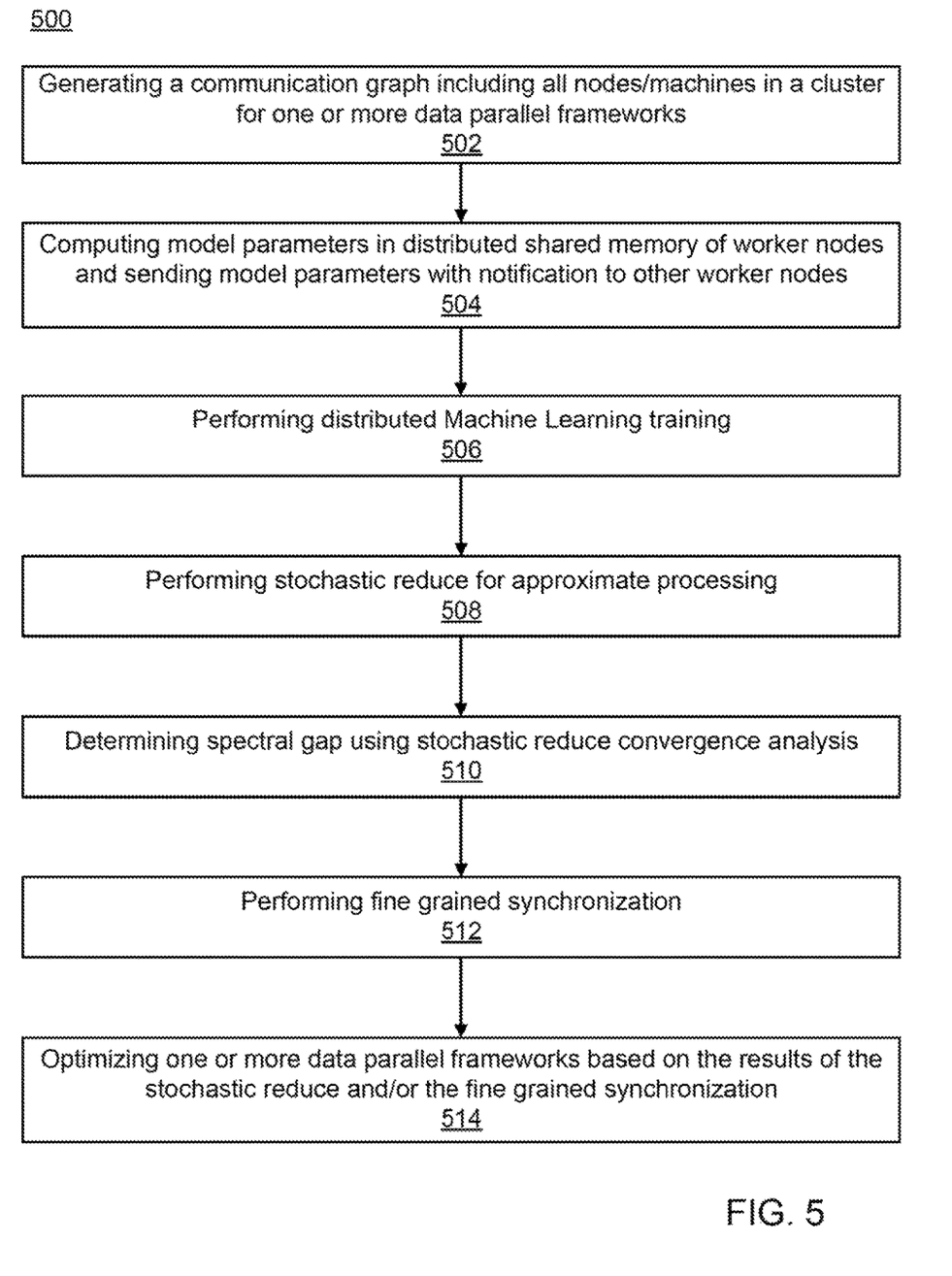
FIG. 5 is a block/flow diagram illustrating a method for providing tunable asynchronous approximate data-parallel processing for large scale data applications using stochastic reduction, in accordance with the present principles.

Referring now to FIG. 5, a method 500 for tunable asynchronous approximate data-parallel processing for large scale data applications using stochastic reduction is illustratively depicted in accordance with the present principles.

In one embodiment, one or more communication graphs (e.g., expander graph) including all nodes/machines (e.g., worker node, master node) in a cluster for one or more data parallel frameworks is generated in block 502. In an exemplary embodiment, a fixed communication cost, which may be empirically determined, may be selected, which enables selection of an appropriate out-degree of each of the nodes in the communication graphs in accordance with the present principles.

In block 502, a communication graph including all nodes/machines in a cluster may be generated for one or more data parallel frameworks. In block 504, model parameters may be computed in memory of worker nodes, and the model parameters may be sent with notification to other worker nodes. A sparse graph may be determined such that the graph has good information dispersal properties with this fixed communication cost in block 502. Good information dispersal properties means that the nodes are connected in such a manner that intermediate output from one particular node (e.g., parameter updates in the case of parallel machine learning), disperse to all other nodes in a fewest time steps. If the nodes are connected in, for example, a chain-like fashion, the intermediate outputs from node i may spread to i+1 in a single time step, but may take N time steps to reach the last node in the cluster. Hence, intuitively well-connected graphs may converge faster, but may exhibit high communication costs.

In block 504, to measure how every node diffuses its intermediate results (e.g., model parameters), an adjacency matrix is taken, and is divided by an in-degree of each node in the communication graph, which may be denoted as P. This representation may be compressed to a vector by computing the second largest singular value, and calculate the spectral gap as follows:

$$1-\sigma 2(P),$$

where σ2(P) is the second highest spectral gap of a matrix P. P may be calculated as A/d, where A is the adjacency graph (or communication graph of the network of nodes), and d is the in-degree of each node including itself. The high spectral gap determined ensures that model updates from one node are propagated over the network rapidly, which enables sufficiently fast convergence. This sparse reduce, in which the underlying communication node graph has a high spectral gap may be referred to as spectral reduce. In various embodiments, distributed ML is performed in block 506 for two or more iterations in accordance with the present principles.

In block 508 stochastic reduce for approximate processing is performed, and one or more spectral gaps are determined using stochastic reduce convergence analysis in block 510 in accordance with the present principles. In accordance with the present principles, an exemplary optimization problem for convergence for stochastic reduce may be defined on, for example, a connected undirected network, and may be solved by in nodes collectively:

$$\min_{x \in X \subseteq \mathbb{R}^d} \overline{f}(x) := \sum_{i=1}^{n} f_i(x).$$

In one embodiment, the feasible set X is a closed and convex set in $\mathbb{R}^d$ and is known by all nodes, where $f_i: X \in \mathbb{R}$ is a convex function privately known by the node i. It may be assumed that $f_i$ s L-Lipschitz continuous over X with respect to the Euclidean norm $\|\cdot\|$. The network G=(N, ε)network, with the node set N=[n]:={1, 2, . . . , n} and the edge set ε⊆N×N, specifies the topological structure on how the information is spread amongst the nodes through local node interactions over time. Each node i can only send and retrieve information as defined by the node communication graph N(i):={j|(j,i)∈ε} and itself.

In accordance with various embodiments, fine grained synchronization may be performed in block 512. Optimization and control of one or more data parallel frameworks may be performed based on the results of the stochastic reduce and/or the fine grained synchronization in block 514 in accordance with the present principles.

Figure 6:
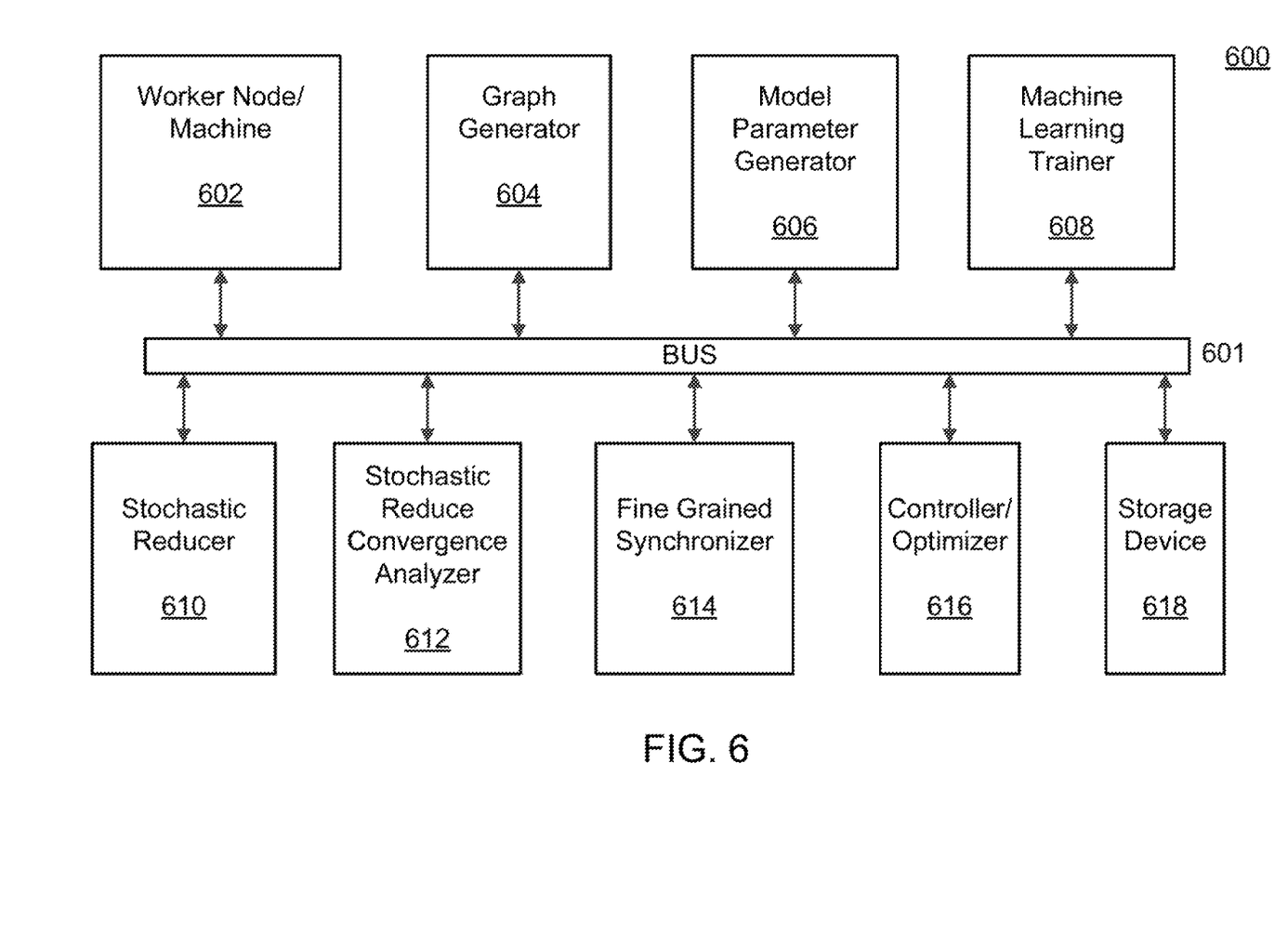
FIG. 6 is a block/flow diagram illustrating a system for providing tunable asynchronous approximate data-parallel processing for large scale data applications using stochastic reduction, in accordance with the present principles.

Referring now to FIG. 6, a block/flow diagram showing a system for providing tunable asynchronous approximate data-parallel processing for large scale data applications using stochastic reduction is illustratively depicted in accordance with the present principles.

While many aspects of system 600 are described in singular form for the sakes of illustration and clarity, the same can be applied to multiples ones of the items mentioned with respect to the description of system 600. For example, while a single worker node/machine 602 is described, more than one worker node/machine 602 can be used in accordance with the teachings of the present principles, while maintaining the spirit of the present principles. Moreover, it is appreciated that the worker node/machine 602 is but one aspect involved with system 800 than can be extended to plural form while maintaining the spirit of the present principles.

The system 600 can include a bus 601, which may be connected to one or more computing networks and/or storage devices 618. A graph generator 604 may be employed to generate a plurality of types of network communication graphs in accordance with various embodiments. A model parameter generator 606 determines various model parameters, and a machine learning trainer 608 performs two or more iterations of machine learning in accordance with the present principles. A stochastic reducer 610 may be employed for stochastic reduction, and a stochastic reduce convergence analyzer 612 maybe employed to determine one or more spectral gaps in accordance with the present principles. Fine grained synchronization may be performed using a fine grained synchronizer 614, and a controller/optimizer 616 may be employed to optimize one or more data parallel frameworks based on the results of the stochastic reduce and/or the fine grained synchronization in accordance with the present principles.

In accordance with an exemplary embodiment, a distributed ML framework may be implemented by the controller 616, which may incorporate stochastic reduce and fine-grained synchronization in accordance with the present principles. Distributed data-parallel model averaging may be implemented over stochastic gradient descent (SGD). The reference framework may be implemented with stochastic reduce and NOTIFY-ACK support in C++ and provide, for example, Lua bindings to run any or a plurality of deep learning networks.

In one embodiment, for distributed communication, Model Parameter Interface (MPI) may be employed to create model parameters in distributed shared memory in accordance with the present principles. In one implementation, parallel model replicas create a model vector in the shared memory, and may be trained by the machine learning trainer 608 on a portion of the dataset using the SGD algorithm. To reduce synchronization overheads, each node/machine may maintain a per-sender receive queue to receive the model updates from other machines. The queues and the shared memory communication between the model replicas may be created based on a node communication graph provided as an input when launching a job, which may be received or generated by the graph generator 604. The model replicas may process the partitioned dataset and synchronize and reduce periodically using the stochastic reducer 610 and the fine grained synchronizer 614 in accordance with the present principles.

In an exemplary embodiment, the infiniBand transport may be employed, and each worker node may directly write the intermediate model to its senders without interrupting the receive side CPU, using one-sided RDMA operations. After the reduce operation, each machine may send out the model updates to the queues of other machines, as defined by the input communication graph. Furthermore, the synchronous, asynchronous and NOTIFY-ACK based synchronization may be implemented and controlled using the controller 616. Synchronous (BSP) training may be implemented by using a barrier primitive, and low-level distributed wait and notify primitives may be employed to implement NOTIFY-ACK in accordance with the present principles.

In an exemplary embodiment, separate infiniBand queues may be employed for transmitting short messages (e.g., ACKs and other control messages) and large model updates (e.g., a fixed size for a specific dataset). For Ethernet based implementation, separate TCP flows can be used to reduce the latency of control messages. Fault tolerance may be performed by checkpointing the trained model periodically to the disk. Additionally, for synchronous methods, a dataset specific dynamic timeout which is a function of the time taken for the reduce operation may be implemented for fault tolerance in accordance with the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for building a distributed learning framework, comprising:
    generating a sparse communication network graph with a high overall spectral gap, the generating comprising:
        computing model parameters in distributed shared memory of a cluster of a plurality of worker nodes;
        determining a spectral gap of an adjacency matrix for the cluster using a stochastic reduce convergence analysis, wherein a spectral reduce is performed using a sparse reduce graph with a highest possible spectral gap value for a given network bandwidth capability, the stochastic reduce convergence being optimized for a connected undirected network solved by n nodes collectively by:

$$\min_{x \in \mathcal{X} \subseteq \mathbb{R}^d} \bar{f}(x) := \sum_{i=1}^{n} f_i(x)$$

where a feasible set x is a closed and convex set in $\mathbb{R}^d$ and is known by each of the n nodes, and $f_i$ is L-Lipschitz continuous over x with respect to a Euclidean norm $\|\bullet\|$; and
    optimizing the communication graph by iteratively performing the computing and determining until a threshold condition is reached; and
    controlling each of the plurality of worker nodes using tunable approximation based on available bandwidth in a network in accordance with the generated sparse communication network graph.

2. The method as recited in claim 1, wherein the spectral reduce comprises performing a reduce with fewer than all of the worker nodes, wherein a selection of the worker nodes for performing the spectral reduce is made based on a spectral gap of the generated sparse communication network graph.

3. The method as recited in claim 1, wherein parallel model replicas based on the computed model parameters create a model vector in the distributed shared memory and train on a portion of a dataset using stochastic gradient descent (SGD) to maintain approximate and eventual consistency of the model vector.

4. The method as recited in claim 1, wherein the worker nodes are parallel worker nodes configured to compute and send individual model parameters with notifications to one or more other worker nodes.

5. The method as recited in claim 1, further comprising reducing synchronization overheads by maintaining a per-sender receive queue at each of the worker nodes for receiving model updates from other worker nodes.

6. The method as recited in claim 1, wherein the generated sparse communication network graph is determined such that the graph has good information dispersal properties with a predetermined fixed communication cost.

7. The method as recited in claim 1, further comprising limiting model update propagation for reduced network communication in parallel machine learning based on the generated sparse communication network graph.

8. A system for building a distributed learning framework, comprising:
    a processor coupled to a memory, the processor being configured to:
        generate a sparse communication network graph with a high overall spectral gap, the generating comprising:
            computing model parameters in distributed shared memory of a cluster of a plurality of worker nodes;
            determining a spectral gap of an adjacency matrix for the cluster using a stochastic reduce convergence analysis, wherein a spectral reduce is performed using a sparse reduce graph with a highest possible spectral gap value for a given network bandwidth capability, the stochastic reduce convergence being optimized for a connected undirected network solved by n nodes collectively by:

$$\min_{x \in \mathcal{X} \subseteq \mathbb{R}^d} \bar{f}(x) := \sum_{i=1}^{n} f_i(x)$$

where a feasible set x is a closed and convex set in $\mathbb{R}^d$ and is known by each of the n nodes, and $f_i$ is L-Lipschitz continuous over x with respect to a Euclidean norm $\|\cdot\|$; and optimizing the communication graph by iteratively performing the computing and determining until a threshold condition is reached; and a controller for controlling each of the plurality of worker nodes using tunable approximation based on available bandwidth in a network in accordance with the generated sparse communication network graph.

9. The system as recited in claim 8, wherein the spectral reduce comprises performing a reduce with fewer than all of the worker nodes, wherein a selection of the worker nodes for performing the spectral reduce is made based on a spectral gap of the generated sparse communication network graph.

10. The system as recited in claim 8, wherein parallel model replicas based on the computed model parameters create a model vector in the distributed shared memory and train on a portion of a dataset using stochastic gradient descent (SGD) to maintain approximate and eventual consistency of the model vector.

11. The system as recited in claim 8, wherein the worker nodes are parallel worker nodes configured to compute and send individual model parameters with notifications to one or more other worker nodes.

12. The system as recited in claim 8, further comprising reducing synchronization overheads by maintaining a per-sender receive queue at each of the worker nodes for receiving model updates from other worker nodes.

13. The system as recited in claim 8, wherein the generated sparse communication network graph is determined such that the graph has good information dispersal properties with a predetermined fixed communication cost.

14. The system as recited in claim 8, wherein model update propagation for reduced network communication in parallel machine learning is limited based on the generated sparse communication network graph.

15. A non-transitory computer readable storage medium comprising a computer readable program for building a distributed learning framework, wherein the computer readable program when executed on a computer causes the computer to perform the steps of:

generating a sparse communication network graph with a high overall spectral gap, the generating comprising:

computing model parameters in distributed shared memory of a cluster of a plurality of worker nodes;

determining a spectral gap of an adjacency matrix for the cluster using a stochastic reduce convergence analysis, wherein a spectral reduce is performed using a sparse reduce graph with a highest possible spectral gap value for a given network bandwidth capability, the stochastic reduce convergence being optimized for a connected undirected network solved by n nodes collectively by:

$$\min_{x \in \mathcal{X} \subseteq \mathbb{R}^d} \bar{f}(x) := \sum_{i=1}^{n} f_i(x)$$

where a feasible set x is a closed and convex set in $\mathbb{R}^d$ and is known by each of the n nodes, and $f_i$ is L-Lipschitz continuous over x with respect to a Euclidean norm $\|\cdot\|$; and optimizing the communication graph by iteratively performing the computing and determining until a threshold condition is reached; and controlling each of the plurality of worker nodes using tunable approximation based on available bandwidth in a network in accordance with the generated sparse communication network graph.

16. The non-transitory computer readable storage medium as recited in claim 15, wherein the spectral reduce comprises performing a reduce with fewer than all of the worker nodes, wherein a selection of the worker nodes for performing the spectral reduce is made based on a spectral gap of the generated sparse communication network graph.

17. The non-transitory computer readable storage medium as recited in claim 15, wherein parallel model replicas based on the computed model parameters create a model vector in the distributed shared memory and train on a portion of a dataset using stochastic gradient descent (SGD) to maintain approximate and eventual consistency of the model vector.

18. The non-transitory computer readable storage medium as recited in claim 15, wherein the worker nodes are parallel worker nodes configured to compute and send individual model parameters with notifications to one or more other worker nodes.

19. The non-transitory computer readable storage medium as recited in claim 15, further comprising reducing synchronization overheads by maintaining a per-sender receive queue at each of the worker nodes for receiving model updates from other worker nodes.

20. The non-transitory computer readable storage medium as recited in claim 15, wherein the generated sparse communication network graph is determined such that the graph has good information dispersal properties with a predetermined fixed communication cost.

\* \* \* \* \*